A. C. FRIES.
ATTACHMENT FOR EDUCATIONAL GLOBES.
APPLICATION FILED JAN. 10, 1910.

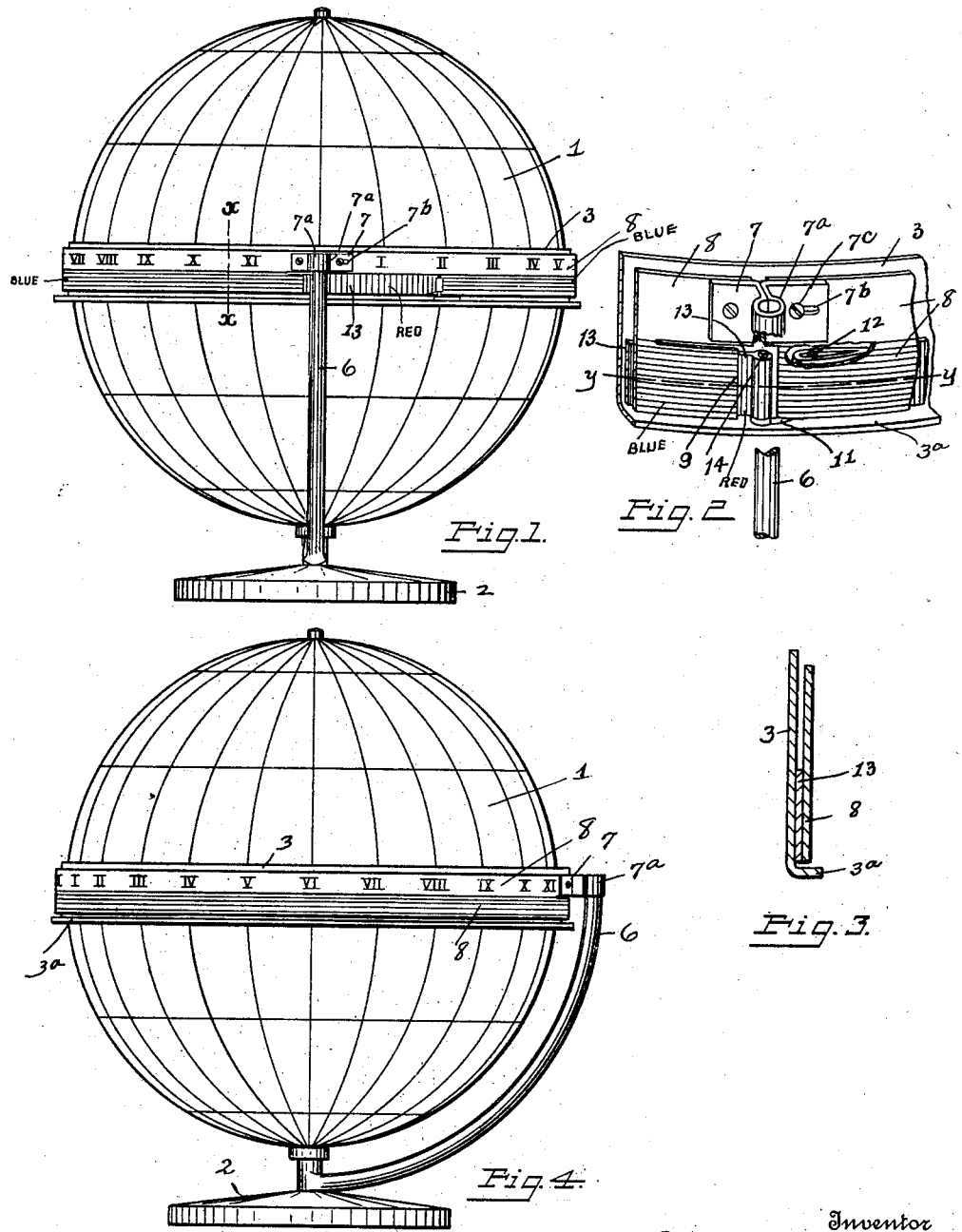

978,997.

Patented Dec. 20, 1910.
2 SHEETS—SHEET 2.

Witnesses
E. Maurer
A. L. Phelps

Inventor
Albert C. Fries
By C. Shepherd
Attorney

UNITED STATES PATENT OFFICE.

ALBERT C. FRIES, OF GROVE CITY, OHIO.

ATTACHMENT FOR EDUCATIONAL GLOBES.

978,997.  Specification of Letters Patent.  Patented Dec. 20, 1910.

Application filed January 10, 1910. Serial No. 537,103.

*To all whom it may concern:*

Be it known that I, ALBERT C. FRIES, a citizen of the United States, residing at Grove City, in the county of Franklin and State of Ohio, have invented certain new and useful Improvements in Attachments for Educational Globes, of which the following is a specification.

My invention relates to the improvement of attachments for educational globes.

The objects of my invention are to provide an improved attachment for globes of the class mentioned, comprising means for indicating the changes in the days of the week at the international date line; to combine therewith improved means for indicating the variations in time throughout the earth; to so construct my improved attachment as to produce the desired indications or demonstrations by imparting a rotary movement to the globe and to produce other improvements the details of which will be more fully pointed out hereinafter. These objects I accomplish in the manner illustrated in the accompanying drawings, in which—

Figure 5:
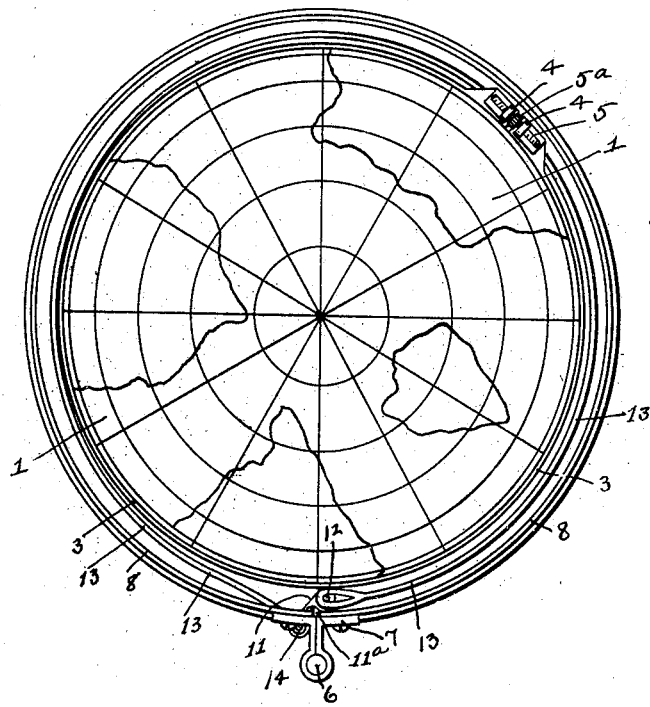
Figure 6:
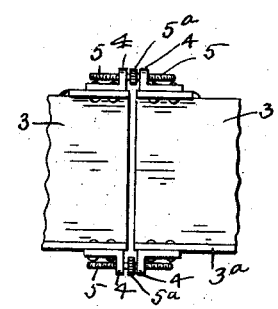
Figure 7:
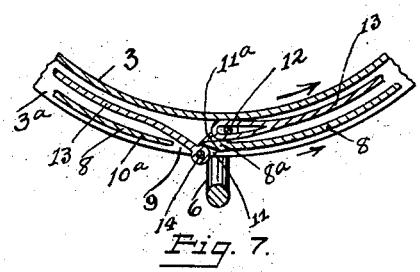
Figure 8:
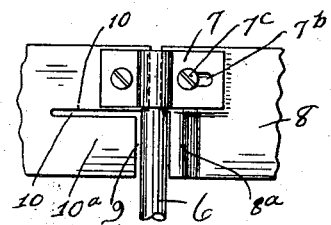

Figure 1 is a view in elevation of a globe having my attachment thereon, Fig. 2 is a view partly in perspective and partly in section illustrating the positions of the bands which encircle the globe, Fig. 3 is an enlarged sectional view through the bands on line $x$—$x$ of Fig. 1, Fig. 4 is a view in elevation of the globe taken at right angles from that shown in Fig. 1, Fig. 5 is a plan view of the globe and attachments shown in Fig. 1, Fig. 6 is a detail view in elevation illustrating the manner of adjustably connecting the ends of the inner band which encircles and is carried by the globe, Fig. 7 is a longitudinal section on line $y$—$y$ of Fig. 2, and, Fig. 8 is an outer face view of the connected end portions of the outer stationary band.

Similar numerals refer to similar parts throughout the several views.

I employ my attachment in connection with an ordinary educational globe such as indicated at 1, upon which appears a map of the earth's surface, said globe having its lower side pivotally mounted in any usual or well known manner upon a stationary base 2. Surrounding the globe at its greatest diameter and fitting snugly thereon is an inner band 3, which comprises a strip of sheet metal, the adjacent ends of which are provided on their upper and lower sides with angular brackets 4 the outwardly projecting members of which are formed with threaded openings, the internal threads of the openings of each pair of said bracket projections being respectively right and left hand or of reversed inclination. The threaded openings of each pair of these bracket projections receive an adjusting and connecting screw 5, the threads of which on one side of the center of the length of the screw are right hand threads and those on the other side of the center of the length, are left hand threads, to conform to the internal threads of the openings in the members 4.

In order to draw the ends of the band 3 toward each other or force the same away from each other as may be desired in using the band on globes of different sizes, I provide the center of the length of the connecting screw with a fixed nut or finger wheel $5^a$ to facilitate the rotating of the screw. The base or lower edge portion of the band 3 is formed throughout its length, with an outwardly projecting flange $3^a$. With the base 2 or the pivot sleeve which rises therefrom is rigidly connected a curved outwardly and upwardly extending arm 6 the upper termination of which is on the outer side of the central portion of the globe. The upper end of the arm 6 engages a socket member $7^a$ which is formed in the central outwardly projecting arm of a bracket or connecting plate 7. This plate serves as indicated more clearly in Fig. 2 of the drawing, to connect the ends of a band 8 which is on the outer side of and separated from the inner band 3, said band 8 being supported by the arm 6 with its lower edge above the flange $3^a$ of the band 3. The band 8 is capable of being adjusted with reference to the size of the circle described thereby, this adjustment being accomplished by forming in one wing of the plate 7 a slotted opening $7^b$ through which a screw $7^c$ passes and engages the band 8. It is obvious that this screw may be loosened and the ends of the band brought nearer to each other or moved away from each other and the screw again tightened to hold the band end in its new position. The lower half of the band 8 is suitably distinguished from the upper half thereof preferably by coloring the same and we will assume in the present instance that the lower half of the band 8 is of a blue color. The upper half of the band 8 above the colored portion has suitably applied thereto at equidistant points on its face, numerals indicating the hours of the day.

Beneath the coupling plate 7, the band 8 is separated by a comparatively wide opening 9, the upper end of this opening connecting on one side with a horizontal slit 10 formed in the body of the band, which results in the formation of a more or less flexible tongue member 10$^a$ in said band. One end of the band 8 which is on the opposite side of the opening 9 from the end of the tongue 10$^a$ and which is opposite the upper portion of the arm 6, is slightly thickened or enlarged as indicated at 8$^a$, said thickened portion having a tapering or beveled extension or termination as shown more clearly in Fig. 7. To the upper face of the flange 3$^a$ of the band 3 at a point opposite the international date line on the globe, I pivot at the center of its length a short link or bar 11, the pivot point being indicated at 11$^a$. The bar 11 is of such thickness as to permit of its traveling beneath the band 8 and of such length as to cause one of its ends to project outward beyond the flange 3$^a$, while the other end thereof is between the stationary band 8 and the globe band 3. One end of the bar 11 is provided with an upwardly projecting pin 12 which engages a loop in one end of a band 13, the outer end of this band being of a different color from the band 8 and which color we will assume is red. The remaining end of the band 13 is connected with a pin 14 which is on the remaining end of the bar 11.

It will be understood that when the pivot pin of the bar 11 is in the position shown in Figs. 5 and 7 of the drawing, that is, opposite the upper portion of the arm or standard 6, substantially all of the band 13 will be incased between the bands 8 and 3, with the result that the outer blue color of the band 8 only will be exposed, said blue colored band indicating one day of the week, which for example, we will say is Monday. It will thus be understood that it will be midnight at all places on the globe opposite the arm 6. When the globe is turned, however, in the direction of the arrow in Fig. 7, it is obvious that the corresponding movement imparted to the band 3 and its flange 3$^a$, will result in drawing that end of the band 13 which is connected with the pin 14, outward through the opening 9, the red band thus being drawn in the direction of the moving globe along the outer side of the fixed band 8, the red color indicating a succeeding day of the week which in the present case, will be Tuesday. It will therefore be understood that at all points on the globe opposite the exposed red surface of the band 13, it will be Tuesday, while on that space of the globe which is opposite the exposed blue surface, it will be Monday. It will also be understood that the division between the two days will occur at the point opposite the pivot 11$^a$ of the bar 11. The moving of the band 13 to points immediately beneath the hour numerals on the upper portion of the band 8, will cause such numerals to indicate the time of day in that part of the world which is opposite said band end.

It will be understood that when a complete revolution of the globe has been made, substantially all of the band 8 will be covered by the red band 13 and that as the movement of the globe is continued, that end of the band which engages the pin 12 will be drawn in through the opening 9 and again gradually incased between the bands 8 and 3. In order to facilitate the movement of the rounded ends of the band 13 inward and outward through the opening 9, I have provided the beveled head or termination 8$^a$ on the band 8, the inner and outer bevels of said head acting to guide the ends of the band inward and outward through said opening.

In order to make one end of the band 13 more flexible and permit it to bend in its passage in and out of the opening 9, I have provided the slit 10 in said band.

From the foregoing description, it will be seen that simple and efficient means are herein provided for accomplishing the objects of the invention, but while the elements shown and described are well adapted to serve the purposes for which they are intended, it is to be understood that the invention is not limited to the precise construction set forth, but includes within its purview such changes as may be made within the scope of the appended claims.

What I claim, is—

1. In an educational globe and attachment therefor, the combination with a rotatably mounted globe body, a fixed arm extending to a point opposite the center of the height of the globe and an external band carried by the upper end of said arm and encircling the globe at a distance therefrom, said band connected with said arm and having an opening therein as described, of a band carried by the globe and having a base flange, a bar pivoted on said base flange, and a flexible band having its ends pivotally engaging the ends of said bar, said last named band and said external band being of different colors or otherwise treated so as to be readily distinguished one from the other, said flexible band, during one revolution of the globe, being drawn over and partially concealing the external band, and during the succeeding revolution of the globe, being drawn into and concealed by said external band.

2. In an educational globe and attachment therefor, the combination with a rotatably mounted globe body, a fixed arm extending to a point opposite the center of the height of the globe and an external band carried by the upper end of said arm and encircling the globe at a distance therefrom, said band connected with said arm and having an opening therein and having hour indications on its upper portion, of a band carried by the globe and having a base flange, a bar pivoted on said base flange, and a flexible band having its ends pivotally engaging the ends of said bar, said last named band and said external band being of different colors or otherwise treated so as to be readily distinguished one from the other, and means for changing the circumference of the external band and the globe carrying band, said flexible band, during one revolution of the globe, being drawn over and partially concealing the external band, and during the succeeding revolution of the globe, being drawn into and concealed by said external band.

In testimony whereof I affix my signature in presence of two witnesses.

ALBERT C. FRIES.

Witnesses:
A. L. PHELPS,
C. C. SHEPHERD.